(12) United States Patent
Uehara

(10) Patent No.: US 10,527,730 B2
(45) Date of Patent: Jan. 7, 2020

(54) OBJECT DETECTION SYSTEM

(71) Applicant: Toyota Motor Engineering & Manufacturing North America, Inc., Erlanger, KY (US)

(72) Inventor: Yasuo Uehara, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 171 days.

(21) Appl. No.: 15/331,025

(22) Filed: Oct. 21, 2016

(65) Prior Publication Data

US 2017/0115396 A1    Apr. 27, 2017

Related U.S. Application Data

(60) Provisional application No. 62/244,780, filed on Oct. 22, 2015.

(51) Int. Cl.
| | |
|---|---|
| *G01C 22/00* | (2006.01) |
| *G01S 17/93* | (2006.01) |
| *G01S 17/02* | (2006.01) |
| *G01S 17/89* | (2006.01) |
| *G01S 7/48* | (2006.01) |

(52) U.S. Cl.
CPC .......... *G01S 17/936* (2013.01); *G01S 7/4802* (2013.01); *G01S 7/4808* (2013.01); *G01S 17/023* (2013.01); *G01S 17/89* (2013.01)

(58) Field of Classification Search
CPC ...... G01S 17/936; G01S 7/499; G01S 17/006; G01S 17/026; G05D 1/024

USPC .......... 701/25, 32.3, 32.4, 300, 416
See application file for complete search history.

(56) References Cited

U.S. PATENT DOCUMENTS

| | | | |
|---|---|---|---|
| 8,577,538 B2 | 11/2013 | Lenser et al. | |
| 8,849,483 B2* | 9/2014 | Kuwata | G05D 1/0206 701/21 |
| 9,784,835 B1* | 10/2017 | Droz | G01S 17/08 |

(Continued)

OTHER PUBLICATIONS

Baran et al.; "Multi-Modal Detection of Man-Made Objects in Simulated Aerial Images"; Proc. of SPIE; May 18, 2013; pp. 1-12; vol. 8743; (12 pages).

(Continued)

*Primary Examiner* — Khoi H Tran
*Assistant Examiner* — B M M Hannan
(74) *Attorney, Agent, or Firm* — Christopher G. Darrow; Darrow Mustafa PC

(57) ABSTRACT

In a method involving the recognition of ambiguous objects from samples of 3D points, an initial constant is set for properties of prospective points of an object, and a sample of 3D points is received from a 3D sensor. When the sensed locations in space of points of objects represented by the 3D points are the same as those for the prospective points of an object, they are redefined as an actual points of objects, and the initial constants are replaced with corresponding properties represented by the 3D points. An ambiguous object is then recognized from a sparsely populated cluster of actual points of an object identified based on the replacement of the initial constants. The ambiguous object is confirmed based on signals representing its surface properties received from a polarization image sensor.

20 Claims, 4 Drawing Sheets

(56) References Cited

U.S. PATENT DOCUMENTS

| | | | |
|---|---|---|---|
| 2007/0152804 A1* | 7/2007 | Breed | B60N 2/2863 340/435 |
| 2007/0219720 A1* | 9/2007 | Trepagnier | B60W 30/00 701/300 |
| 2010/0166294 A1* | 7/2010 | Marrion | G06K 9/00214 382/154 |
| 2013/0116880 A1* | 5/2013 | Shitamoto | G05D 1/0236 701/25 |
| 2015/0292876 A1* | 10/2015 | Pettersson | G01C 15/00 348/136 |
| 2016/0291134 A1* | 10/2016 | Droz | G01S 7/4802 |
| 2017/0043771 A1* | 2/2017 | Ibanez-Guzman | B60W 30/0956 |

OTHER PUBLICATIONS

Overton; "Novel Cameras: Polarization difference imaging camera reveals 'unseen' features"; retrieved from the Internet: <http://www.laserfocusworld.com/articles/print/volume-48/issue-10/world-news/novel-cameras-polarization-difference-imaging-camera-reveals-unseen-features.htm>: Retrieved Oct. 21, 2015; dated Oct. 11, 2012; (7 pages).

* cited by examiner

OBJECT DETECTION SYSTEM

CROSS REFERENCE TO RELATED APPLICATIONS

This application claims benefit of U.S. Provisional Application No. 62/244,780, filed on Oct. 22, 2015, which is herein incorporated by reference in its entirety.

TECHNICAL FIELD

The embodiments disclosed herein generally relate to autonomous operation systems for vehicles, and object detection systems therefore that are supported by LIDAR sensors.

BACKGROUND

Some vehicles include an operational mode in which a computing device is used to navigate and/or maneuver the vehicle along a travel route with minimal or no input from a human driver. Such vehicles include an object detection system that is configured to detect information about the environment surrounding the vehicle, including the presence of objects in the environment. In these vehicles, the computing device is configured to process the detected information to determine how to navigate and/or maneuver the vehicle through the environment. In many instances, the object detection system is supported by a LIDAR sensor.

SUMMARY

Disclosed herein are embodiments of methods involving the recognition of ambiguous objects from samples of 3D points. In one aspect, an initial constant is set for at least one property of each of a plurality of prospective points of an object having respective locations in space, and a sample of 3D points each representing a sensed location in space of a point of an object, and at least one sensed property of the point of an object, is received from a 3D sensor. For each 3D point in the sample, when the sensed location in space of the point of an object represented by the 3D point is the same as the location in space of a prospective point of an object, the prospective point of an object is redefined as an actual point of an object, and the initial constant set for the at least one property of the actual point of an object is replaced with the at least one sensed property of the point of an object represented by the 3D point. An ambiguous object is then recognized from a sparsely populated cluster of actual points of an object identified based on the replacement of the initial constant set for the at least one property of the actual points of an object in the cluster with the least one sensed property of the points of objects represented by the 3D points. The ambiguous object is confirmed based on signals representing its surface properties received from a polarization image sensor.

In another aspect, an initial constant is set for at least one property of each of a plurality of prospective points of an object having respective locations in space, and a sample of 3D points each representing a sensed location in space of a point of an object, and at least one sensed property of the point of an object, is received from a 3D sensor. For each 3D point in the sample, when the sensed location in space of the point of an object represented by the 3D point is the same as the location in space of a prospective point of an object, the prospective point of an object is redefined as an actual point of an object, and the initial constant set for the at least one property of the actual point of an object is replaced with the at least one sensed property of the point of an object represented by the 3D point. An ambiguous object is then recognized from a sparsely populated cluster of actual points of an object identified based on the replacement of the initial constant set for the at least one property of the actual points of an object in the cluster with the least one sensed property of the points of objects represented by the 3D points. A closest actual point of an object in the cluster is identified, and the remaining actual points of an object in the cluster are assigned new simulated locations in space that correspond to the location in space of the identified closest actual point of an object in the cluster.

In yet another aspect, an initial constant is set for at least one property of each of a plurality of prospective points of an object having respective locations in space, and a sample of 3D points each representing a sensed location in space of a point of an object, and at least one sensed property of the point of an object, is received from a 3D sensor. The sample of 3D points is taken according to a sampling rate for a set of samples of 3D points taken over a time period in which the poses of objects are projected to stay substantially the same. For each 3D point in the sample, when the sensed location in space of the point of an object represented by the 3D point is the same as the location in space of a prospective point of an object, the prospective point of an object is redefined as an actual point of an object, and the initial constant set for the at least one property of the actual point of an object is replaced with the at least one sensed property of the point of an object represented by the 3D point. An ambiguous object is then recognized from a sparsely populated cluster of actual points of an object identified based on the replacement of the initial constant set for the at least one property of the actual points of an object in the cluster with the least one sensed property of the points of objects represented by the 3D points. The sampling rate for the set of samples of 3D points is increased based on the recognition of the ambiguous object.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches an object detection system whose operation is supported by a 3D sensor, such as a LIDAR sensor. The object detection system uses 3D points generated by the 3D sensor to recognize ambiguous objects, for example, in an environment surrounding a vehicle. When it recognizes ambiguous objects, the object detection system takes various actions to support the vehicle in its efforts to appropriately avoid the ambiguous objects when driving.

Figure 1:
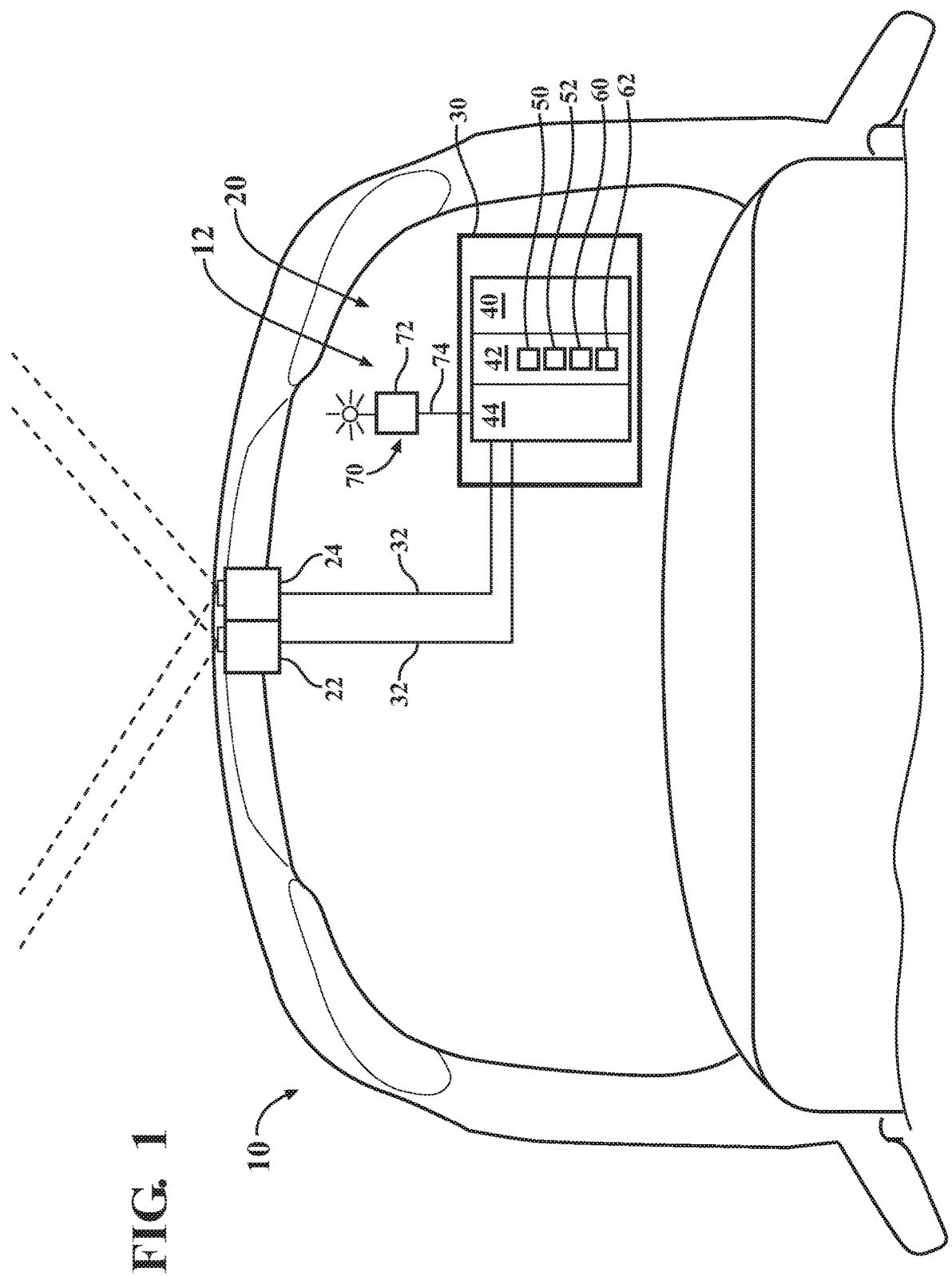
FIG. 1 is a schematic representation of a vehicle including an object detection system whose operation is supported by a LIDAR sensor and a complementary polarization image sensor.

FIG. 1 shows a vehicle 10 including an autonomous operation system 12 with an object detection system 20 whose operation is supported by a LIDAR sensor 22 and a complementary polarization image sensor 24. The LIDAR sensor 22 and the polarization image sensor 24 are mounted on the vehicle 10 and positioned to have a common field of view in the environment surrounding the vehicle 10. Although the vehicle 10 is provided as a non-limiting example of a mobile platform, it will be understood that the autonomous operation system 12 and its object detection system 20 could be implemented in other mobile platforms. Additionally, although the LIDAR sensor 22 is provided as a non-limiting example of a 3D sensor, it will be understood that this description is applicable in principle to other 3D sensors.

The LIDAR sensor 22 is configured to scan the environment surrounding the vehicle 10 and generate signals, including but not limited to 3D points, representing the objects in the environment surrounding the vehicle 10.

Generally, the LIDAR sensor 22 can include a transmitter and a receiver. The transmitter can be can component or group of components that can transmit laser signals (e.g., laser light energy). As an example, the transmitter can be a laser, laser rangefinder, LIDAR, and/or laser scanner. The laser signals can have any suitable characteristics. In one or more arrangements, the laser signals can be from any suitable portion of the electromagnetic spectrum, such as from the ultraviolet, visible, or near infrared portions of the electromagnetic spectrum. The laser signals can be eye safe.

The laser signals can be transmitted into the environment surrounding the vehicle 10. The laser signals can impinge upon objects in the environment that are located in the path of the laser signals. The laser signals may be transmitted in series of 360 degree spins around a vertical (Z) axis of the vehicle 10, for example. Generally, when the laser signals impinge upon an object, a portion of the laser signals can be returned (e.g., by reflection) to the LIDAR sensor 22. The returned portion of the laser signals can be captured at the LIDAR sensor 22 by its receiver, which may be, or include, one or more photodetectors, solid state photodetectors, photodiodes or photomultipliers, or any combination of these.

Responsive to capturing the returned laser signals, the LIDAR sensor 22 can be configured to output signals indicative of an object, or the lack thereof, in the environment surrounding the vehicle 10. The LIDAR sensor 22 can include a global positioning system (GPS) or other positioning system for identifying its position, and an inertial measurement unit (IMU) for identifying its pose. According this configuration, the output signals may be 3D points representing objects in the environment surrounding the vehicle 10. The 3D points represent, among other things, the location in space of the points from which the returned laser signals are received, and therefore, the location in space of points of objects on which the laser signals impinged. The LIDAR sensor 22 may determine the location in space of points of objects based on the distance from the LIDAR sensor 22 to the points of objects, as well as the position and pose of the LIDAR sensor 22 associated with the returned laser signals. The distance to the points of objects may be determined from the returned laser signals using the time of flight (TOF) method, for instance. The output signals may also represent the locations in space from which no returned laser signals are received, and therefore, the lack of points of objects in those locations in space on which the laser signals would otherwise have impinged.

The 3D points may further represent other aspects of the returned laser signals, which, in turn, may represent other associated properties of points of objects on which the incident laser signals impinged beyond their location in space. These aspects of the returned laser signals can include their amplitude, intensity or reflectivity, for instance, or any combination of these.

The polarization image sensor 24 can also be configured to output signals indicative of an object, or the lack thereof, in the environment surrounding the vehicle 10. Generally, the polarization image sensor 24 can include a polarizing filter positioned in front of an image sensor. The image sensor can be configured for capturing light or other electromagnetic energy from the environment surrounding the vehicle 10. Optionally, the environment can be illuminated by the transmitter of the LIDAR sensor 22. The image sensor can be, or include, one or more photodetectors, solid state photodetectors, photodiodes or photomultipliers, or any combination of these.

Responsive to capturing light or other electromagnetic energy, the polarization image sensor 24 can be configured to output signals indicative of objects, or the lack thereof, in the environment surrounding the vehicle 10. The signals can represent the polarization signatures and other surface properties of objects from which the light or other electromagnetic energy is reflected.

In support the of the object detection system 20 as a whole, the polarization image sensor 24 can complement the LIDAR sensor 22, for instance, by generally compensating for its blind spots. The LIDAR sensor 22 can have a blind spot for low reflective and unreflective (e.g., some dark or transparent) points of objects. Despite the physical presence of these points of objects at given locations in space, little or none of the laser signals transmitted by the LIDAR sensor 22 and impinging upon them are returned to the LIDAR sensor 22 for capture. In cases of low reflective points of objects, the 3D points output by the LIDAR sensor 22 may represent some but not all of their locations in space as those from which returned lasers signals are received. Accordingly, there will be a sparse, or low, population of 3D points representing the objects. In cases of unreflective points of objects, the 3D points output by the LIDAR sensor 22 may represent none of their locations in space as those from which returned lasers signals are received. Accordingly, there will be no population of 3D points representing the objects.

The polarization image sensor 24 can compensate for these blind spots by outputting signals representing the polarization signatures and other surface properties of points of the objects, which in the case of the polarization image sensor 24 are largely the product of their physical presence, as opposed to their reflectivity.

The vehicle 10 includes a computing device 30 to which the LIDAR sensor 22 and the polarization image sensor 24 are communicatively connected through one or more communication links 32. Although the computing device 30 and either or both of the LIDAR sensor 22 and the polarization image sensor 24 may be dedicated to the autonomous operation system 12 and its object detection system 20, it is contemplated that some or all of these could also support the operation of other systems of the vehicle 10.

The computing device 30 may include a processor 40 communicatively coupled with a memory 42. The processor 40 may include any device capable of executing machine-readable instructions, which may be stored on a non-transitory computer-readable medium, for example the memory 42. The processor 40 may include a controller, an integrated circuit, a microchip, a computer, and/or any other computing device. The memory 42 may include any type of computer readable medium suitable for storing data and algorithms. For example, the memory 42 may include RAM, ROM, a flash memory, a hard drive, and/or any device capable of storing machine-readable instructions.

The computing device 30 may also include an input/output interface 44 for facilitating communication between the processor 40 and the LIDAR sensor 22 and the polarization image sensor 24. Although the computing device 30 is schematically illustrated as including a single processor 40 and a single memory 42, in practice the computing device 30 may include a plurality of components, each having one or more memories 42 and/or processors 40 that may be communicatively coupled with one or more of the other components. The computing device 30 may be a separate standalone unit or may be configured as a part of a central control system for the vehicle 10.

The various algorithms and data for the autonomous operation system 12 and its object detection system 20, as well as the other systems of the vehicle 10, may reside in whole or in part in the memory 42 of the computing device 30. In operation of the object detection system 20, the signals output by the LIDAR sensor 22 are stored in the memory 42 as LIDAR data 50, and the signals output by the polarization image sensor 24 are stored in the memory 42 as polarization image data 52. As described in additional detail below, the algorithms and data for the autonomous operation system 20 are included as part of a detection module 60 and a planning module 62.

Although the various algorithms and data for the autonomous operation system 12 and its object detection system 20 are described with reference to the computing device 30 of the vehicle 10 for simplicity, it will be understood that these may reside in whole or in part in a memory of a computing device separate from the vehicle 10. In these cases, the vehicle 10 may also include an integrated mobile communication system 70 with variously configured communication hardware for wirelessly transmitting data between the computing device 30 and a mobile network, such as a cellular network. The mobile communication system 70 and the mobile network together enable the computing device 30 to wirelessly communicate with other devices connected to the mobile network, such as a remote server that may similarly be, or include, a computing device including one or more processors and one or more memories, or another vehicle that may similarly include an object detection system with a computing device including one or more processors and one or more memories.

The mobile communication system 70 of the vehicle 10 may include an integrated mobile network transceiver 72 configured to transmit and receive data over the mobile network. The mobile network transceiver 72 may be communicatively connected to the computing device 30 though a mobile network transceiver communication link 74, with the input/output interface 44 facilitating communication between the processor 40 and the memory 42 and the mobile network transceiver 72. The mobile network transceiver 72 includes a transmitter for wirelessly transferring data from the computing device 30 to the mobile network and a receiver for wirelessly transferring data from the mobile network to the computing device 30.

Figure 2:
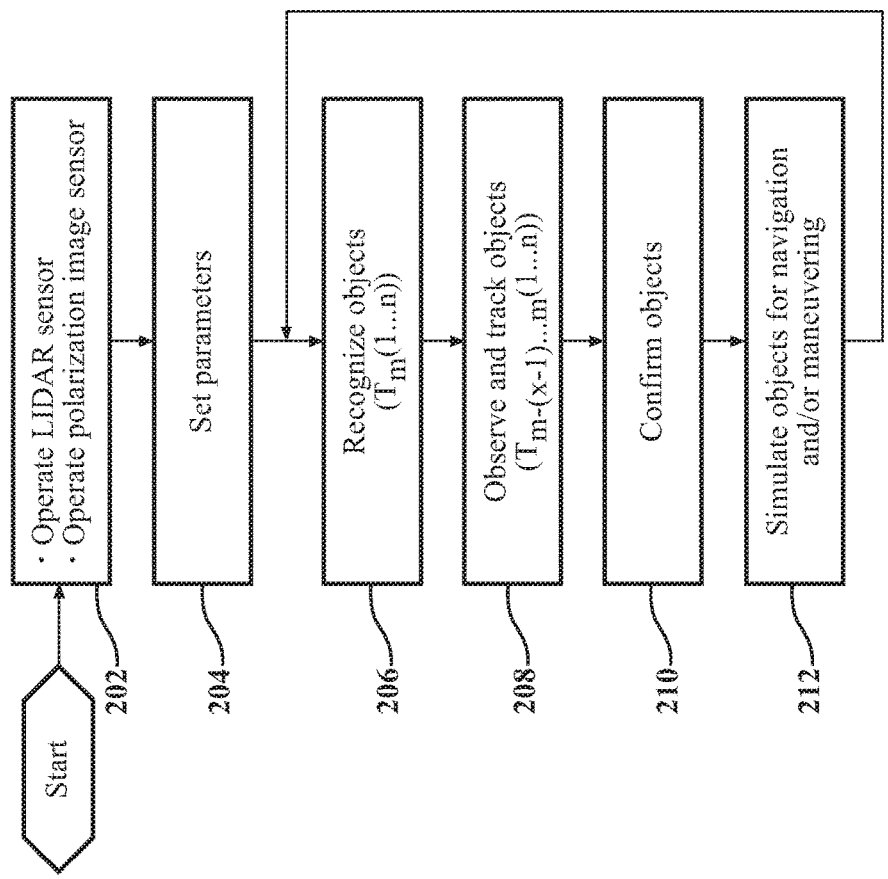
FIG. 2 is a flow diagram depicting the operations of a process for performing object detection by recognizing objects from a set of samples of output signals, observing and tracking objects from LIDAR data from a temporal series of sets of samples of output signals, confirming objects with polarization image data, and simulating objects based on the results for purposes of navigating and/or maneuvering the vehicle.

The operations of a process 200 by which the detection module 60 employs the remainder of the object detection system 20 of the vehicle 10 to perform object detection are shown in FIG. 2.

Initially, in operation 202, the LIDAR sensor 22 is signaled to operate, and its output signals, including 3D points representing the location in space of points of objects in the environment surrounding the vehicle 10, if any, as well as other associated properties of those points of objects represented by aspects of returned laser signals, are received and stored as LIDAR data 50. Also, the polarization image sensor 24 is signaled to operate, and its output signals representing surface properties such as polarization signatures of objects, if any, in the environment surrounding the vehicle 10 are received and stored as polarization image data 52.

Figure 3:
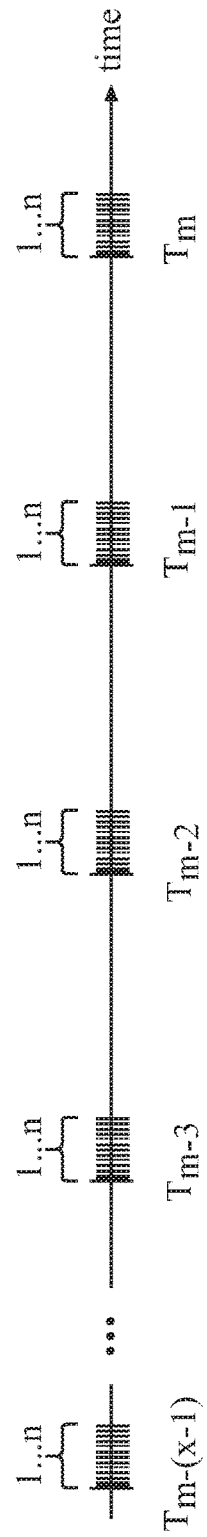
FIG. 3 is a graphical representation of the sampling of the LIDAR sensor's output signals into a temporal series of sets of samples of output signals.

The LIDAR sensor 22 may operate at high frequencies, for instance, on the order of 10 to 1,000 KHz, with each round of operation resulting in a sampling of output signals. In an implementation of the process 200 represented in FIG. 3, at a given time $T_m$, a set of n samples of output signals $T_m(1 \ldots n)$ (i.e., $T_m(1), T_m(2), T_m(3) \ldots T_m(n)$) can be taken for corresponding n rounds of operation of the LIDAR sensor 22. The set of n samples of output signals $T_m(1 \ldots n)$ is taken over a time period. With a high frequency of the sampling of output signals, the time period may be short enough that the poses of any objects in the environment surrounding the vehicle 10 are projected to stay substantially the same as the set of n samples of output signals $T_m(1 \ldots n)$ is taken, even if the objects are moving with respect to the LIDAR sensor 22 or otherwise with respect to the vehicle 10.

Moreover, a temporal series of sets of n samples of output signals $T_{m(x-1) \ldots m}(1 \ldots n)$ can be taken over multiple consecutive times. The temporal series of sets of n samples of output signals $T_{m(x-1) \ldots m}(1 \ldots n)$ may include the set of n samples of output signals $T_m(1 \ldots n)$ from the most current time $T_m$, and similar sets of n samples of output signals from x previous times. The time periods between the most current time $T_m$, and successive preceding x previous times may be long enough that the poses of any objects in the environment surrounding the vehicle 10 change as the temporal series of sets of n samples of output signals $T_{m(x-1) \ldots m}(1 \ldots n)$ is taken if the objects are moving with respect to the LIDAR sensor 22 or otherwise with respect to the vehicle 10.

Optionally, in operation 204, parameters for output, receipt, storage or other predicates to further consideration of the LIDAR data 50 can be set, either in the LIDAR sensor 22 or in the computing device 30, as the case may be, that prescribe minimums, maximums or ranges for any properties of interest of points of objects. For example, a parameter can be set that prescribes the maximum distance from the vehicle 10 of points of objects for further consideration. In this example, in order for a 3D point to satisfy this parameter and qualify for further consideration, the location in space of the point of an object that the 3D point represents must be within the prescribed maximum distance from the vehicle 10.

Figure 4:
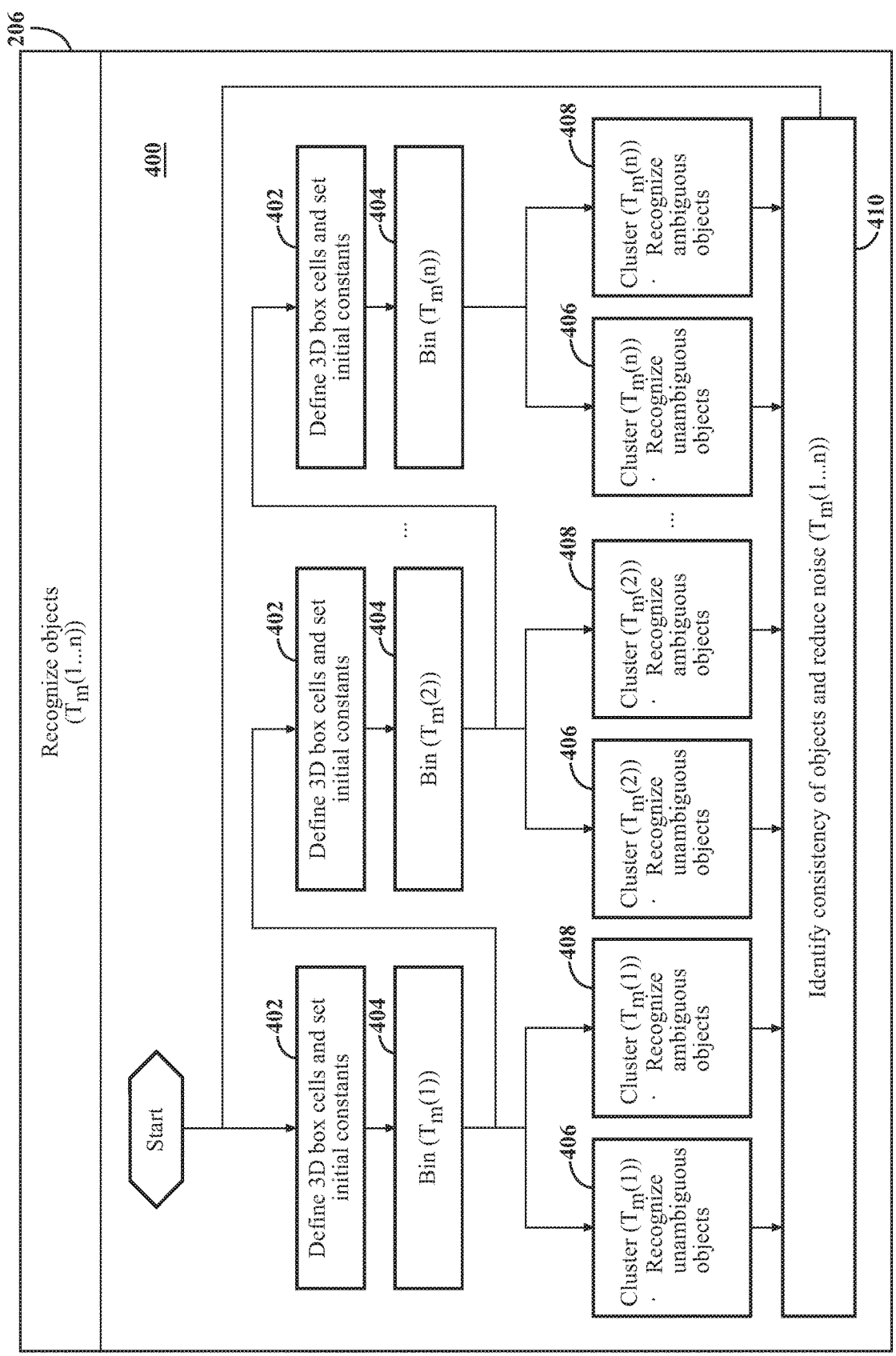
FIG. 4 is a flow diagram depicting the operations of a process for recognizing objects by receiving, binning and clustering LIDAR data.

In operation 206, objects are recognized from the set of n samples of output signals $T_m(1 \ldots n)$ from the most current time $T_m$, according to the operations of a process 400 shown in FIG. 4 and described below. For the time $T_m$, one, some or all of the operations described below may be repeated across the set of n samples of output signals $T_m(1 \ldots n)$. In other words, object recognition is based on the set of n samples of output signals $T_m(1 \ldots n)$. As noted above, the time period over which the set of n samples of output signals $T_m(1 \ldots n)$ is taken is short enough that the poses of any objects in the environment surrounding the vehicle 10 stay substantially the same. In previous iterations of operation 206 and the process 400, the same and other objects may have been recognized from similar sets of n samples of output signals from previous times in the temporal series of sets of n samples of output signals $T_{m(x-1) \ldots m}(1 \ldots n)$.

One or more 3D box cells are defined in operation 402. Each 3D box cell occupies a respective 3D space in the environment surrounding the vehicle 10, and has prospective points of objects in it. Beyond the prospective points of objects themselves, various properties of the prospective points of objects are also defined. These properties of the prospective points of objects correspond to those of points of objects that could be represented in 3D points output by the LIDAR sensor 22 in response to capturing returned laser signals impinging on them. Accordingly, the properties of the prospective points of objects may include their location in space representing, for instance, their distance to the vehicle 10, as well as associated properties, such as their amplitude, intensity or reflectivity, for instance, or any combination of these.

Additionally, for each 3D box cell, initial constants are set for one, some or all of the properties of the prospective points of objects in the 3D box cell. These initial constants may, for example, be maximum or minimum values for the properties of the prospective points of objects in the 3D box cell. Accordingly, these initial constraints may be the maximum or minimum values for their location in space representing, for instance, their distance to the vehicle 10, as well as for their amplitude, intensity or reflectivity, for instance, or any combination of these.

The points of objects in the environment surrounding the vehicle 10 are represented in the LIDAR data 50 by respective 3D points. The 3D points represent, among other things, the location in space of the points of objects. Based on their locations in space, the actual points of objects are binned in the 3D box cells in operation 404. More specifically, based on their locations in space, as represented by 3D points, the actual points of objects are binned in the appropriate 3D box cells that contain the corresponding prospective points of objects with the same locations in space.

As the points of objects are binned in the 3D box cells, the initial constants set for the properties of the corresponding prospective points of objects in the 3D box cells are replaced with the sensed properties of the points of objects represented by the 3D points. For example, an initial constant set for the location in space of a prospective point of an object in a 3D box cell representing its distance to the vehicle 10 may be replaced with the sensed location in space of a point of an object represented by a 3D point representing its actual distance to the vehicle 10. Further, for example, an initial constant set for the amplitude, intensity and/or reflectivity of a prospective point of an object in a 3D box cell may be replaced with the associated sensed amplitude, intensity and/or reflectivity, as the case may be, of a point of an object represented by a 3D point.

In each 3D box cell, in operations 406 and 408, the resident points of individual objects are clustered, and the clustered points are recognized as objects in the environment surrounding the vehicle 10. The clustering may involve identifying updates from the initial constants set for one, some or all of the properties, such as location in space representing distance to the vehicle 10, or amplitude, intensity and/or reflectivity, of prospective points of objects in the 3D box cell to their respective replacements resulting from the binning of points of objects into the 3D box cell. For a given prospective point of an object in the 3D box cell, in the case of an updated value from its initial constant, a point of an object is identified and clustered with other identified points of objects, while in the case of an un-updated value from its initial constant, a point of an object not identified. The clustering may involve detecting a certain amount of deviation in one or more properties of interest, such as location in space representing distance to the vehicle 10, or amplitude, intensity or reflectivity of a point of an object under consideration from those properties of interest of one or more neighboring points of objects.

As a component of the overall clustering, the recognized object may be identified as an unambiguous object, in operation 406, or as an ambiguous object, in operation 408.

Figure 5:
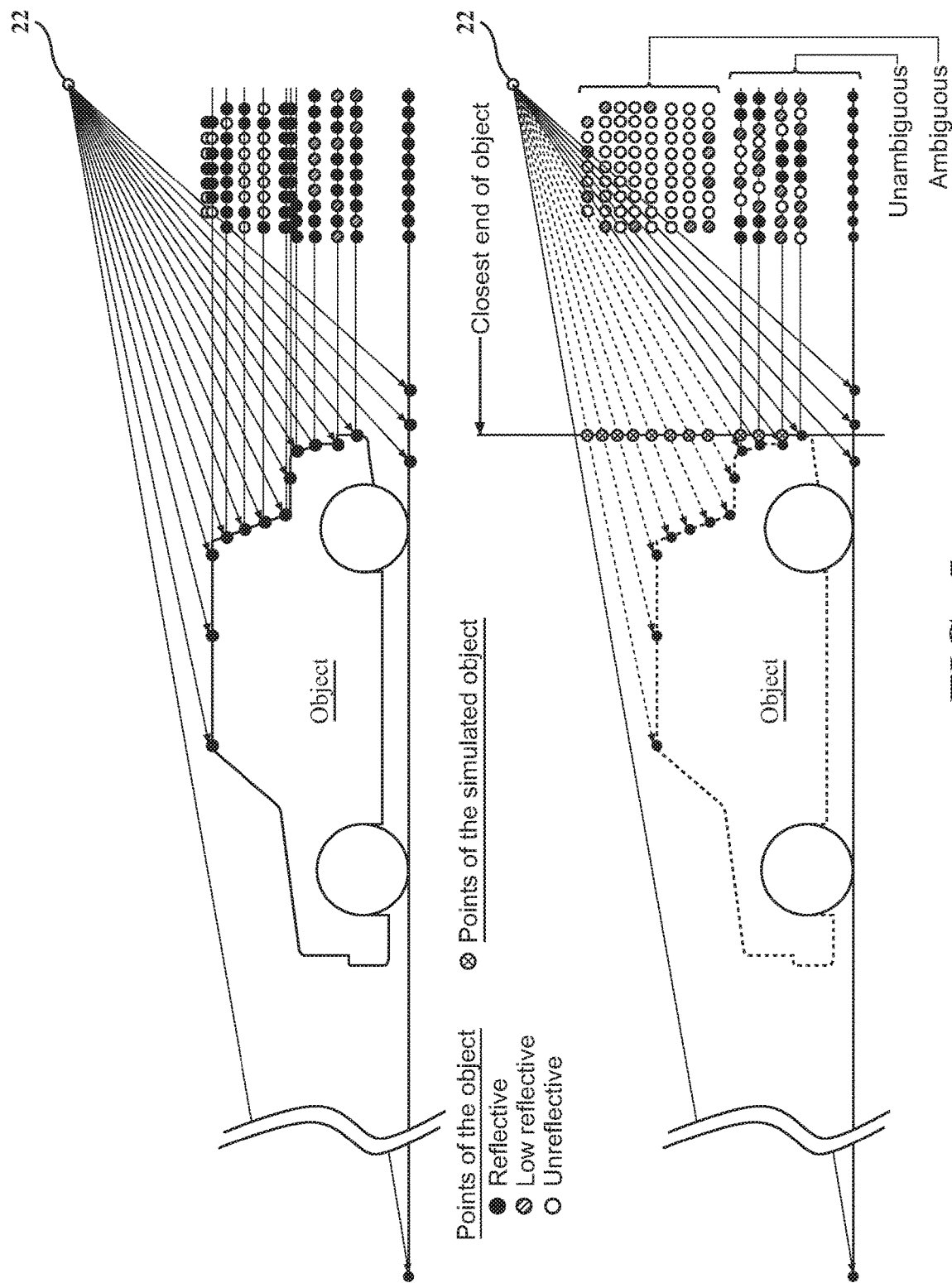
FIG. 5 is a pictorial representation of aspects of the operations depicted in FIG. 2.

As shown with additional reference to FIG. 5, often as a result of an object in the environment surrounding the vehicle 10 being reflective, the object is well represented via a high population of 3D points and, as a result, a high population of resident points of the object in the 3D box cells. Accordingly, there is a high confidence of the object actually existing in the environment surrounding the vehicle 10. The objects recognized from these clustered points of objects may be identified as unambiguous objects.

However, often as a result of an object in the environment surrounding the vehicle 10 being low reflective, the object is represented, but not well, via a low population of 3D points and, as a result, a low population of resident points of the object in the 3D box cells. The resident points of the object in the 3D box cells may, for instance, be localized around an edge of an associated group of prospective points of objects from which no points of objects are identified. In this and other examples of low populations of resident points of an object in the 3D box cells, the resident points of the object in the 3D box cell may be clustered with associated groups of prospective points of objects from which no points of objects are identified, and the objects recognized from these clustered points may be identified as ambiguous objects. On the other hand, the lack of a recognized object may be identified from no population of resident points of objects in the 3D box cells.

As noted above, object recognition is based on the set of n samples of output signals $T_m(1 \ldots n)$. The level of consistency of output signals for a recognized object across the set of n samples of output signals $T_m(1 \ldots n)$ can be identified, and the noise across the set of n samples of output signals $T_m(1 \ldots n)$ for a recognized object can be reduced, in operation 410. Optionally, to promote object recognition, the parameters for accumulating the set of n samples of output signals $T_m(1 \ldots n)$ can be optimized in-process based on the level of consistency. For example, in cases of identified ambiguous objects, the sampling rate, and therefore n, can be increased in order to accumulate more samples of output signals as compared to cases of identified unambiguous objects.

In operation 208 of the process 200, once objects are recognized from the set of n samples of output signals $T_m(1 \ldots n)$ from the most current time $T_m$, the temporal series of sets of n samples of output signals $T_{m(x-1) \ldots m}(1 \ldots n)$ including the set of n samples of output signals $T_m(1 \ldots n)$ from the most current time $T_m$, and similar sets of n samples of output signals from x previous times, can be evaluated to observe and track the recognized objects over time in order to identify their continuity of location and motion.

In operation 210, surfaces in the environment surrounding the vehicle 10 can be recognized based on their surface properties represented in the polarization image data 52, and recognized objects can be confirmed by identifying the recognized surfaces as corresponding to the recognized objects. Although this is particularly advantageous for those recognized objects identified as ambiguous objects, the robustness of the object detection system 20 is improved for both those recognized objects identified as ambiguous objects and those recognized objects identified as unambiguous objects.

Recognized objects identified as ambiguous objects may, for instance, be the product of blooming or virtual reflections caused by the sun, for instance, or by other illumination sources, optics or reflectors, such as multipath or other types of reflectors, for instance in the headlight units of other vehicles in the environment surrounding the vehicle 10. If a recognized object is an ambiguous object, it can be rejected if it cannot be confirmed that it corresponds to a recognized surface. This reduces or eliminates the influence of blooming, virtual reflections or other optical illusions, and reduces or eliminates the false positives which would otherwise occur.

As shown in FIG. 5, for the points of a recognized object in the 3D box cells, the closest point of the object to the vehicle 10 may be identified from among the points of the object from their locations in space. This may represent, for instance, the closest end of the object. In operation 212, for the remaining points of the object in the 3D box cells, their locations in space may be reassigned the same distance to the vehicle 10 as that for the identified closest point of the object to the vehicle 10, with the result being LIDAR-based simulated points of the object.

Often as a result of an object in the environment surrounding the vehicle 10 being unreflective, the object is not represented via points of an object in the 3D box cells. These objects, however, will have surfaces in the environment surrounding the vehicle 10 recognized based on their surface properties represented in the polarization image data 52. For any remaining recognized surfaces surrounding the recognized object but not identified as corresponding to the recognized object, additional polarization image-based points of the object may be simulated in the in the 3D box cells, while assigning, for their location in space, the same distance to the vehicle 10 as that for the identified closest point of the object to the vehicle 10.

In collaboration with the process 200, the planning module 62 may plan how to navigate, maneuver or otherwise drive the vehicle 10 through the environment surrounding the vehicle 10 based on the object represented by the LIDAR-based simulated points of the object and the polarization image-based simulated points of the object, while avoiding the object, and the autonomous operation system 12 of the vehicle 10 can drive the vehicle 10 along the route according to the plan.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method, comprising:
setting, using a detection module executable by at least one processor, an initial constant for at least one property of each of a plurality of spatially predefined prospective points of an object having respective locations in space and prospectively representable by 3D points from a 3D sensor;
receiving, using the detection module executable by the at least one processor, from the 3D sensor, a sample of 3D points each representing a sensed location in space of a point of an object, and at least one sensed property of the point of an object;
using the detection module executable by the at least one processor, for each 3D point in the sample, when the sensed location in space of the point of an object represented by the 3D point is the same as the location in space of a prospective point of an object, redefining the prospective point of an object as an actual point of an object, and replacing the initial constant set for the at least one property of the actual point of an object with the at least one sensed property of the point of an object represented by the 3D point;
clustering, using the detection module executable by the at least one processor, actual points of an object with associated un-redefined prospective points of an object based on the replacement of the initial constant set for the at least one property of the actual points of an object in the cluster with the at least one sensed property of the points of objects represented by the 3D points;
recognizing, using the detection module executable by the at least one processor, an ambiguous object from a sparse population of the actual points of an object in the cluster relative to the associated un-redefined prospective points of an object in the cluster; and
confirming, using the detection module executable by the at least one processor, the ambiguous object based on signals representing its polarization signature received from a polarization image sensor.

2. The method of claim 1, wherein the at least one property of each of the plurality of prospective points of an object, and the at least one sensed property of the point of an object, are each at least one of an amplitude, an intensity and a reflectivity.

3. The method of claim 2, wherein the initial constant set for at the at least one property of each of the plurality of prospective points of an object is a maximum or minimum value of the at least one of an amplitude, an intensity and a reflectivity.

4. The method of claim 1, further comprising:
driving, using a planning module executable by the at least one processor, a vehicle along a route based on the recognized and confirmed ambiguous object.

5. The method of claim 1, further comprising:
identifying, using the detection module executable by the at least one processor, a closest actual point of an object in the cluster; and
assigning, using the detection module executable by the at least one processor, the remaining actual points of an object in the cluster new simulated locations in space that correspond in closeness to the location in space of the identified closest actual point of an object in the cluster.

6. The method of claim 5, further comprising:
driving, using a planning module executable by the at least one processor, a vehicle along a route based on the new simulated locations in space of the actual points of an object in the cluster.

7. The method of claim 1, wherein the 3D sensor is a LIDAR sensor.

8. A method, comprising:
setting, using a detection module executable by at least one processor, an initial constant for at least one property of each of a plurality of spatially predefined prospective points of an object having respective locations in space and prospectively representable by 3D points from a 3D sensor;
receiving, using the detection module executable by the at least one processor, from the 3D sensor, a sample of 3D points each representing a sensed location in space of a point of an object, and at least one sensed property of the point of an object;
using the detection module executable by the at least one processor, for each 3D point in the sample, when the sensed location in space of the point of an object represented by the 3D point is the same as the location in space of a prospective point of an object, redefining the prospective point of an object as an actual point of an object, and replacing the initial constant set for the at least one property of the actual point of an object with the at least one sensed property of the point of an object represented by the 3D point;
clustering, using the detection module executable by the at least one processor, actual points of an object with associated un-redefined prospective points of an object based on the replacement of the initial constant set for the at least one property of the actual points of an object in the cluster with the at least one sensed property of the points of objects represented by the 3D points;
recognizing, using the detection module executable by the at least one processor, an ambiguous object from a sparse population of the actual points of an object in the cluster relative to the associated un-redefined prospective points of an object in the cluster;
identifying, using the detection module executable by the at least one processor, a closest actual point of an object in the cluster; and
assigning, using the detection module executable by the at least one processor, the remaining actual points of an object in the cluster new simulated locations in space that correspond in closeness to the location in space of the identified closest actual point of an object in the cluster.

9. The method of claim 8, wherein the at least one property of each of the plurality of prospective points of an object, and the at least one sensed property of the point of an object, are each at least one of an amplitude, an intensity and a reflectivity.

10. The method of claim 9, wherein the initial constant set for at the at least one property of each of the plurality of prospective points of an object is a maximum or minimum value of the at least one of an amplitude, an intensity and a reflectivity.

11. The method of claim 8, further comprising:
driving, using a planning module executable by the at least one processor, a vehicle along a route based on the new simulated locations in space of the actual points of an object in the cluster.

12. The method of claim 8, further comprising:
confirming, using the detection module executable by the at least one processor, the ambiguous object based on signals representing its polarization signature received from a polarization image sensor.

13. The method of claim 8, wherein the 3D sensor is a LIDAR sensor.

14. A method, comprising:
setting, using a detection module executable by at least one processor, an initial constant for at least one property of each of a plurality of spatially predefined prospective points of an object having respective locations in space and prospectively representable by 3D points from a 3D sensor;
receiving, using the detection module executable by the at least one processor, from the 3D sensor, a sample of 3D points taken according to a sampling rate for a set of samples of 3D points taken over a time period in which the poses of objects are projected to stay substantially the same, the 3D points each representing a sensed location in space of a point of an object, and at least one sensed property of the point of an object;
using the detection module executable by the at least one processor, for each 3D point in the sample, when the sensed location in space of the point of an object represented by the 3D point is the same as the location in space of a prospective point of an object, redefining the prospective point of an object as an actual point of an object, and replacing the initial constant set for the at least one property of the actual point of an object with the at least one sensed property of the point of an object represented by the 3D point;
clustering, using the detection module executable by the at least one processor, actual points of an object with associated un-redefined prospective points of an object based on the replacement of the initial constant set for the at least one property of the actual points of an object in the cluster with the at least one sensed property of the points of objects represented by the 3D points;
recognizing, using the detection module executable by the at least one processor, an ambiguous object from a sparse population of the actual points of an object in the cluster relative to the associated un-redefined prospective points of an object in the cluster; and
increasing, using the detection module executable by the at least one processor, the sampling rate for the set of samples of 3D points based on the recognition of the ambiguous object.

15. The method of claim 14, wherein the at least one property of each of the plurality of prospective points of an object, and the at least one sensed property of the point of an object, are each at least one of an amplitude, an intensity and a reflectivity.

16. The method of claim 15, wherein the initial constant set for at the at least one property of each of the plurality of prospective points of an object is a maximum or minimum value of the at least one of an amplitude, an intensity and a reflectivity.

17. The method of claim 14, further comprising:
repeating, using the detection module executable by the at least one processor, the setting, receiving, redefining, replacing and recognizing steps for the set of samples of 3D points; and
identifying, using the detection module executable by the at least one processor, the consistency of and reducing the noise among the actual points of an object in the clusters.

18. The method of claim 14, further comprising:
repeating, using the detection module executable by the at least one processor, the setting, receiving, redefining, replacing and recognizing steps to take a temporal series of sets of samples of 3D points taken over consecutive times over which the poses of objects are projected to change; and
tracking, using the detection module executable by the at least one processor, the ambiguous object based on its repeated recognition across the temporal series of sets of samples of 3D points.

19. The method of claim 18, further comprising:
driving, using a planning module executable by the at least one processor, a vehicle along a route based on the tracked ambiguous object.

20. The method of claim 14, wherein the 3D sensor is a LIDAR sensor.

* * * * *

UNITED STATES PATENT AND TRADEMARK OFFICE
CERTIFICATE OF CORRECTION

PATENT NO. : 10,527,730 B2
APPLICATION NO. : 15/331025
DATED : January 7, 2020
INVENTOR(S) : Uehara It is certified that error appears in the above-identified patent and that said Letters Patent is hereby corrected as shown below:

In the Specification
Column 6, Line 40: replace "$T_{m(x-1)...m}(1...n)$" with --$T_{m-(x-1)...m}(1...n)$--
Column 6, Line 42: replace "$T_{m(x-1)...m}(1...n)$" with --$T_{m-(x-1)...m}(1...n)$--
Column 6, Line 50: replace "$T_{m(x-1)...m}(1...n)$" with --$T_{m-(x-1)...m}(1...n)$--
Column 7, Line 14: replace "$T_{m(x-1)...m}(1...n)$" with --$T_{m-(x-1)...m}(1...n)$--
Column 8, Lines 65-66: replace "$T_{m(x-1)...m}(1...n)$" with --$T_{m-(x-1)...m}(1...n)$--

Signed and Sealed this
Thirty-first Day of March, 2020

Andrei Iancu
*Director of the United States Patent and Trademark Office*